United States Patent [19]

Venn

[11] Patent Number: 5,358,751
[45] Date of Patent: Oct. 25, 1994

[54] FERROCEMENT LINING UNITS, METHODS OF MAKING THEM AND METHODS OF LINING A WATER COURSE WITH THEM

[75] Inventor: Anthony B. Venn, Leeds, United Kingdom

[73] Assignee: Hallgarth Construction Limited, London, United Kingdom

[21] Appl. No.: 916,867

[22] Filed: Aug. 11, 1992

[30] Foreign Application Priority Data

Feb. 12, 1990 [GB] United Kingdom .............. 9003086.7
Feb. 12, 1990 [GB] United Kingdom .............. 9003125.3

[51] Int. Cl.$^5$ .......................... B05D 1/02; B23P 6/00; E04B 1/16
[52] U.S. Cl. .................................... 427/421; 427/426; 427/427; 29/402.09; 29/403.11; 29/402.18; 52/382; 118/300; 118/308
[58] Field of Search ............ 427/421, 426, 427, 397.7, 427/403; 118/300, 308; 106/733; 239/549, 553.5, 558, 590, 416.5, 424, 425.5; 29/402.09, 402.14, 402.18, 458, 525.1; 52/249, 382

[56] References Cited

U.S. PATENT DOCUMENTS

| | | | |
|---|---|---|---|
| 2,555,238 | 5/1951 | McNulty et al. | 91/45 |
| 3,042,316 | 7/1962 | Hobson | 239/415 |
| 3,669,418 | 6/1972 | Cornwell et al. | 259/147 |
| 3,708,124 | 1/1973 | Kellert | 239/426 |
| 4,046,357 | 9/1977 | Twitchell | 259/147 |
| 4,125,981 | 11/1978 | MacLeod et al. | 52/309.12 |
| 4,495,228 | 1/1985 | Cornwell | 427/385.5 |
| 4,842,649 | 6/1989 | Heitzmann et al. | 106/89 |

FOREIGN PATENT DOCUMENTS

| | | |
|---|---|---|
| 0152016 | 8/1985 | European Pat. Off. |
| 960857 | 4/1950 | France |
| 1084181 | 1/1955 | France |
| 1203437 | 1/1960 | France |
| 2228364 | 11/1974 | France |
| 2302789 | 10/1976 | France |
| 2594053 | 8/1987 | France |
| 1489604 | 10/1977 | United Kingdom |

OTHER PUBLICATIONS

Concrete International, Sep. 1987, J. P. Romualdi: "Ferrocement for Infrastructure Rehabilitation", pp. 24–28, Sep. 1987.

Chemical Abstracts, vol. 114, 1991, (Columbus, Ohio), Paramasivam et al.: "Long-span precast ferrocement sunscreens in public housing", p. 285.

Chemical Abstracts, vol. 84, 1976, (Columbus, Ohio), p. 343; Abstr. No. 64584k & JP A, 7503114 (Kanebo, Ltd.), 14 Jan. 1975.

Chemical Abstracts, vol. 111, #8, (Columbus, Ohio), 21 Aug. 1989, p. 322, Abstr. No. 62987w, & JP A, 0151351, (Denki Kagaku Kogyo KK), 27 Feb. 1989.

Chemical Abstracts, vol. 102, No. 8, Feb. 1985, (Columbus, Ohio), see p. 276, Abstr. No. 66471k, JP,A,59156946, (Sanko Koroido Kagaki KK), 6 Sep. 1984.

Chemical Abstracts, vol. 106, No. 8, 23 Feb. 1987, (Columbus Ohio), p. 305, Abstr. No. 54931e, & JP, A,61227960, (Denki Kagaku Kogyo KK), 11 Oct. 1986.

*Primary Examiner*—Shrive Beck
*Assistant Examiner*—David M. Maiorana
*Attorney, Agent, or Firm*—Fay, Sharpe, Beall, Fagan, Minnich & McKee

[57] ABSTRACT

Ferrocement lining units are made by spraying aqueous cementitious compositions onto a wire mesh. Such lining units can be used for lining water courses, particularly underground sewers. Preferred cementitious compositions are based on cement powder, silica sand, water, optionally fly ash and possibly other minor additives. In making the lining units, steel wire mesh is supported in a mold and sprayed with the composition preferably by a particular form of gun (5) which is supplied with mortar and compressed air, as part of an overall apparatus that includes a pump (3) and an air compressor (6) which enable spray applications to be effected remotely from the mortar supply and preferably underground for the in-situ lining of sewers. The spray pattern of the gun is adjustable. Controlling the mortar supply and air pressure helps to reduce the problems associated with excessive spray formation and rebound of the applied mortar.

35 Claims, 1 Drawing Sheet

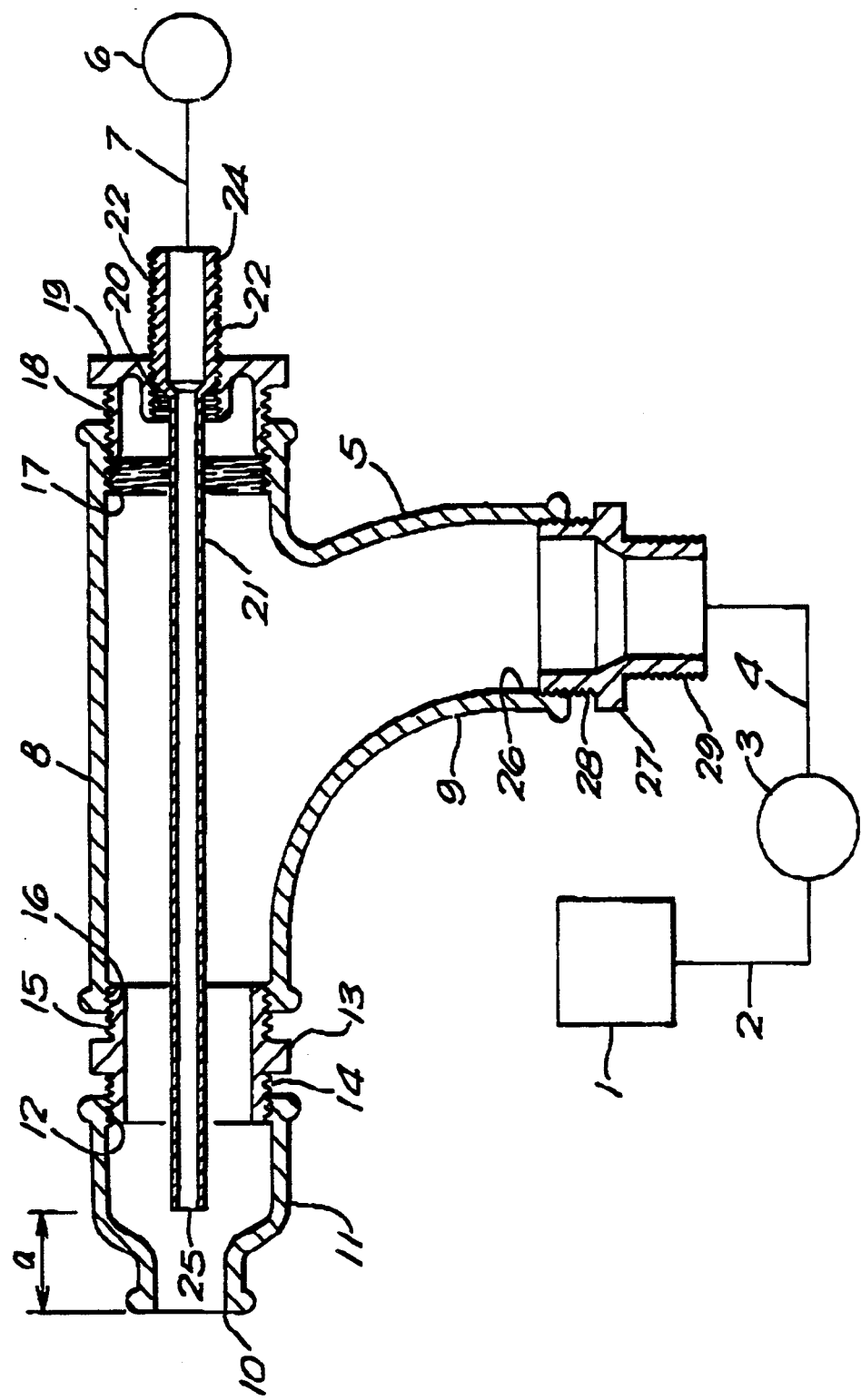

FERROCEMENT LINING UNITS, METHODS OF MAKING THEM AND METHODS OF LINING A WATER COURSE WITH THEM

This invention relates to a method of forming objects, such as one or more layers of ferrocement to an aqueous cementitious composition for use in such a method and to apparatus for use in of forming objects such as layers from ferrocement. In particular the invention relates to a method of forming a ferrocement layer by spray coating, to a spray coating gun for use therein, to a spray coating apparatus incorporating such a gun, and to an aqueous cementitious composition for use therewith.

Ferrocement is one of the oldest forms of reinforced concrete. It basically consists of cement reinforced with steel mesh formed from closely spaced wires which typically range in diameter from about 0.4 mm up to about 2.5 mm, and typically from about 1 mm to about 2 mm in diameter. Typically the spacing between wire centres ranges from about 10 mm up to about 30 mm, e.g. about 12.5 mm or about 25 mm. Compared with conventionally reinforced concrete ferrocement generally has inherently better properties of toughness and crack resistance. These properties, inter alia, make ferrocement a good material for relining sewers and other water courses, whether by way of temporary or permanent repair. They also enable ferrocement to be used for cladding or recladding buildings, other civil engineering structures, reservoirs, hard sea defence walls, tunnels and the like. Ferrocement can also be used for new construction and for repair work in the mining industry to shafts, roadways, air doors, air crossings, reservoirs and the like. Another use of ferrocement is in the construction of boat hulls and other floating structures. It can also be used for making linings to bridge arches, swimming pools, flumes, aqueducts, and thin shell structures.

In making an unsupported ferrocement object, such as the hull of a boat or ship, an armature may be prepared whose shape conforms to the shape of the hull or other object to be made. One or more layers of steel mesh are then laid over the armature, each spaced from the armature surface. Thereafter one or more layers of an aqueous cementitious mixture are applied around the layer or layers of steel mesh. One method of applying the cementitious mixture or mortar is to work it into the interstices of the mesh from each face of the armature with the aid of a trowel. Each layer of applied cement is allowed to firm up before the next is applied. Sufficient cement is applied overall to cover the mesh to a suitable depth so that the mesh is wholly embedded in the set cement which thereby protects the steel mesh from corrosion and against water ingress. Great care has to be taken that the first layers applied from opposite faces of the armature bond adequately one to another and that cavities are not left in the thickness of the skin of the boat or ship hull.

In relining of sewers and other water courses whose condition has deteriorated through the passage of time and which are perhaps deformed and leaking, the mesh can be laid up and the cement of the new lining can be applied in situ. If it is desired to carry out relining under dry conditions, then the section to be relined can be dammed off and the flow directed around the dammed section, for example by overpumping. When diversion of the normal flow is considered to be too difficult or too expensive, invert sections of precast ferrocement can be used to reline the lower part of the sewer or water course. Mesh can then be affixed to the remaining arch of the sewer or water course before applying a cementitious mixture by a trowelling technique in situ. The use of precast invert liners for the bottom part of the sewer or water course permits relining to be carried out without interruption to the sewage or water flow.

Precast ferrocement articles, such as invert sections for use in such relining operations, can be produced in moulds. In this case one or more layers of steel mesh are laid up in the mould, each spaced from the mould surface, following which mortar is applied in several layers as described above.

Another use for ferrocement is cladding or recladding of buildings. Precast sections can be used. Alternatively the cladding can be applied in situ over prefixed steel mesh sections by a trowelling technique.

A survey of the use and properties of ferrocement appeared in an article "Ferrocement for Infrastructure Rehabilitation" by James P. Romualdi in Concrete International, September 1987, pages 24 to 28.

Attempts have been made to speed up application of the mortar layers by pumping the mortar to a hand-held applicator. FIG. 3 of the aforesaid article by Romualdi illustrates one such applicator in use. With such a device the mortar is applied around the wires of the mesh in a manner somewhat reminiscent of toothpaste being squeezed from a tube.

It has also been proposed to spray the mortar onto and through the placed mesh.

Although a spraying technique has the advantage of speeding up application of each layer of cement, a problem arises in that conventional methods of spraying give rise to a thick mist of wet cement.

This problem is particularly acute is confined working conditions such as arise in the relining of sewers and other underground water courses. Indeed so bad can the problem be that it becomes impossible for the person who is carrying out the spraying to see the surface at which he is spraying.

We have found that some of this spray is formed at the spray nozzle but most of it is due to rebound of material from the surface at which the cement mixture is being sprayed.

It is an object of the present invention to provide a method of forming ferrocement objects in which the advantages of speed of application afforded by a spraying technique are attained whilst minimising rebound and the formation of mists of wet cement. In addition the invention seeks to provide a method of spraying cementitious slurry to form a layer of ferrocement in which the formation of a fog or mist of wet cement is substantially reduced. It further seeks to provide a novel cementitious composition for use in production of ferrocement objects. In another aspect the invention seeks to provide an improved form of spray gun for use in production of ferrocement articles. Yet again the invention seeks to provide an improved apparatus for production of ferrocement articles by a spraying technique.

The provision of a compact form of spray gun suitable for use in confined spaces, such as the interior of sewers and underground water courses, and which does not give rise to significant problems or rebound and fog or mist formation is also an aim of the invention.

According to one aspect of the present invention there is provided an aqueous cementitious composition suitable for production of ferrocement objects by a spraying technique comprising cement powder and, per 10 parts by weight of said cement powder, silica sand in the amount of from about 15 parts by weight to about 25 parts by weight, and water in an amount from about 3 parts by weight to about 4 parts by weight.

The invention further provides a method of forming an object of ferrocement which comprises:

(a) providing an assembly which comprises at least one layer of steel wire mesh and an adjacent backing layer;

(b) spraying over the steel wire mesh at least two layers in turn of an aqueous cementitious composition;

(c) working into the interstices of the steel wire mesh and against the backing layer aqueous cementitious composition of at least the first layer sprayed on the steel wire mesh, (d) allowing each layer of aqueous cementitious composition sprayed over the steel wire mesh to dry at least partially before spraying on any next succeeding layer;

(e) working over the steel wire mesh aqueous cementitious composition of the or each layer subsequent to the first layer; and (f) allowing the final layer of aqueous cementitious composition that is sprayed over the steel wire mesh to set whereby a layer of a predetermined minimum thickness of cement is formed over said steel wire mesh;

characterised in that the aqueous cementitious composition comprises cement powder and, per 10 parts by weight of said cement powder, silica sand in an amount of from about 15 parts by weight up to about 25 parts by weight, and water in an amount from about 3 parts by weight to about 4 parts by weight.

In yet another aspect of the invention there is provided a mortar spray gun for use in the production of objects of ferrocement comprising a barrel terminating at a nozzle, an air conduit extending through the barrel from an air inlet at the end of the barrel remote from the nozzle and terminating at an air outlet that lies in a zone adjacent to the nozzle and within the barrel, and a hollow handle portion having a slurry conduit extending therethrough that communicates with the interior of the barrel and terminates at a mortar supply inlet.

The invention further provides apparatus for spraying mortar for use in the production of objects of ferrocement comprising:

(1) mortar reservoir means;

(2) air compressor means;

(3) a mortar spray gun comprising a barrel terminating at a nozzle, an air conduit extending through the barrel from an air inlet at the end of the barrel remote from the nozzle and terminating at an air outlet that lies in a zone adjacent to the nozzle and within the barrel, and a hollow handle portion having a slurry conduit extending therethrough that communicates with the interior of the barrel and terminates at a mortar supply inlet;

(4) mortar pumping means for pumping mortar from the mortar reservoir means to the mortar spray gun;

(5) first mortar conduit means connecting the mortar reservoir means to the mortar pumping means;

(6) second mortar conduit means connecting the mortar pumping means to the mortar inlet; and (7) air hose means connecting the air compressor means to the air inlet of the mortar spray gun.

Preferably the air conduit is mounted adjustably within the mortar spray gun so that the position of the air outlet can be varied in relation to the position of the nozzle, thereby to vary the spray pattern of mortar sprayed by the gun. The range of adjustment of the air outlet is typically from about 15 mm behind the nozzle to about 45 mm behind the nozzle. In a typical embodiment the internal diameter of the nozzle is about 31.75 mm (about 1.25 inches) or about 38.1 mm (1.5 inches), whilst the internal diameter of the air conduit is about 6.35 mm (about 0.25 inches).

In order that the invention may be clearly understood and readily carried into effect, a preferred form of mortar spraying apparatus in accordance with the invention will be described, by way of example only, with reference to the accompanying semi-diagrammatic drawing.

BRIEF DESCRIPTION OF THE DRAWING

FIG. 1 shows a spray gun apparatus in accordance with the invention.

Referring to the drawing a mortar mixing tank 1 is connected by a suitable connection 2 to a pump 3 which is arranged to pump mortar from mortar tank 1 through hose 4 to a mortar spray gun 5. An air compressor 6 feeds compressed air to mortar spray gun 5 by way of hose 7.

Conveniently mixing tank 1 is mounted integrally with pump 3 but at a higher level than pump 3.

In the drawing mortar spray gun 5 is depicted in section. It has a circular section barrel 8 and a hollow handle portion 9, the hollow interior of which communicates with the interior of barrel 8. The axis of hollow handle portion makes an angle of approximately 80° to 90° to the axis of barrel 8. Barrel 8 terminates at its forward end at a nozzle 10 of reduced diameter compared to the diameter of barrel 8. Conveniently nozzle 10 is formed in a separate reducing member 11 having a female screw thread 12 at its rearward end by means of which it is secured on a double threaded connector 13 provided with male threads 14 and 15. Male thread 15 co-operates with a corresponding female thread 16 on the end of barrel 8 to secure connector 13 and reducing member 11 on the end of barrel 8. The rearward end of barrel 8 is formed with a further female thread 17 with which a corresponding mating male thread 18 on a reducing nipple 19 co-operates. Reducing nipple 19 is further formed with a female thread 20. A tube 21 forming an air conduit is located coaxially within barrel 8 by means of an exteriorly threaded portion 22 on a nipple 23 secured, for example by brazing, to the rear end of tube 20. Threaded portion 22 co-operates with female thread 20 on reducing nipple 19. A threaded portion 24 on nipple 23 provides a suitable connection for a connector (not shown) on the end of air hose 7. The position of the air outlet 25 at the forward end of air conduit 21 can be adjusted in relation to the nozzle 10 within a zone which is adjacent the nozzle 10 and within the barrel of the spray gun 5 and which is designated by reference letter a. Such adjustment is achieved by screwing nipple 23 further into or out of reducing nipple 19 and results in variation in the spray pattern of mortar from the gun 5 from a narrow concentrated jet for driving mortar through dense reinforcement to a wide cone section for light sections.

Handle portion 9 has a female thread 26 at its end remote from barrel 8. This receives a reducing nipple 27 with male threaded portions 28 and 29. Portion 29 provides a means for connection of mortar spray gun 5 to a suitable threaded connector (not shown) on the end of mortar supply hose 4. The pump means 3 may comprise a Putzmeister P13 type pump which has been found particularly effective in pumping mortar over long distances, without blockage and without interruption of supply.

In use of the illustrated apparatus a layer or layers of steel wire mesh is or are supported adjacent to and spaced from a suitable backing layer by means of studs or the like. Such a backing layer may be, for example, building paper on mesh, a mould, or the interior of a sewer or other water course to be repaired, or the exterior of a structure to be clad or re-clad. A suitable mortar mix is then prepared in or charged to the mortar tank 1.

An example of a suitable mortar mix is as follows:
10 parts by weight cement powder
20 parts by weight silica sand
3.5 parts by weight water.
A further example of a suitable mortar mix is:
10 parts by weight cement powder
15 parts by weight silica sand
5 parts by weight conditioned fly ash
3.75 parts by weight water.

Preferably the silica sand has a crystalline quartz content of at least about 85% by weight, e.g. about 90% by weight or more. A suitable silica sand has the following chemical anslysis by weight:

| | |
|---|---|
| Silicon Dioxide | 93.4% |
| Titanium Dioxide | 0.1% |
| Aluminium Oxide | 2.73% |
| Iron | 0.53% |
| Magnesium Oxide | 0.27% |
| Calcium Oxide | 0.26% |
| Sodium Oxide | 0.12% |
| Potassium Oxide | 1.71% |
| Loss on Ignition | 0.72% |

Such a sand has a typical grading analysis (by weight) as follows:

| | | |
|---|---|---|
| BS Mesh | 5 mm | % passing 100% |
| | 2.36 mm | % passing 100% |
| | 1.18 mm | % passing 100% |
| | 600 micron | % passing 98.0% |
| | 300 micron | % passing 60.0% |
| | 150 micron | % passing 6.0% |
| | 75 micron | % passing NIL. |

A suitable conditioned fly ash is a pozzolanic fly ash which consists essentially of fumed silica.

If desired, minor amounts of other additives, e.g. $Cr_2O_3$, can be incorporated in the mortar mix. Additional minor amounts of water can be included in the preferred mortar mixes, provided that the water:cement weight ratio does not exceed about 0.4:1.

Pump 3 is designed to provide an essentially continuous high pressure flow of mortar (e.g. at a pressure of up to about 62 bar) through hose 4 to mortar spray gun 5. A suitable pump 3 is a Putzmeister 2-piston pump which is set to deliver mortar at 30 bar to the mortar spray gun. Such a pump can deliver mortar at such a pressure in an amount of from about 4 tonnes per day to about 7 tonnes per day. With such a pump it is suitable to provide an air compressor 6 with an output capacity of approximately 0.038 $m^3$/second (approximately 75 $ft^3$/minute) at a pressure of from about 5 to about 10 bar, e.g., approximately 6.5 bar. With such equipment hoses 4 and 7 can be up to about 200 meters in length without disadvantage. This means that, in the case of sewer relining, the mortar tank and air compressor can be located at ground level adjacent a manhole and the air and mortar pumped via the manhole to the operator who may be working up to about 300 meters away underground. As manholes are usually positioned less than about 400 meters one from another this means that the sewer relining operation can be carried out, even in busy streets, without any more disruption to road traffic than is necessary and certainly with vastly reduced disturbance compared with any operation requiring trench digging. The compact design of the spray gun 5 enables it to be used in cramped conditions, even in the smallest tunnel through which a man can pass. When used with a mortar pump arranged to deliver mortar at high pressure and at a low volume throughout (e.g. at least about 25 bar and at not more than about 1 tonne mortar per hour), the gun can eject mortar in a spray without significant formation of a mist or fog of cement particles and cause high penetration of the mortar into and dense compaction around the steel mesh reinforcement. These factors, coupled with the compact design of the mortar spray gun make it extremely suitable for use even in the smallest sizes of sewer and water course through which a man can pass.

Using such apparatus a layer of mortar of from about 1 cm thick to about 3 cm thick is sprayed over the already positioned steel mesh reinforcement. It is then trowelled over the steel mesh in order to work it into the interstices of the mesh and allowed to set partially. Before the first layer sets completely a further layer can be sprayed on. Typically the second and any subsequent layer is applied within 24 hours from the previous layer. In sewer relining up to 3 layers can be applied in situ by this technique. In manufacture of preformed sections, using a mould as the backing layer, up to 5 layers can be applied by this technique.

To provide adequate protection for the steel mesh reinforcement it is usual to position this in relation to the backing layer and then to apply mortar in one or more layers so that it is covered on all sides as far as possible by a layer of at least about 3 mm thick, and preferably at least about 5 mm thick, up to about 7 mm thick of set mortar.

When relining a sewer or water course the steel reinforcement mesh is preferably set in position by means of small mortar plugs or plastics spacer plugs at least about 10 mm from the wall of the existing sewer after this has been cleaned by hosing. Each panel of steel mesh reinforcement is preferably overlapped by from about 75 mm to about 100 mm with the next panel.

It will usually be preferred to use precast ferrocement invert sections to reline the lower part of a sewer or water course. This permits relining to be carried out without interruption of the flow of sewage or water, as the case may be, and avoids the expense and inconvenience of above ground overpumping which is necessary if relining is to be done under dry conditions.

The first step in relining of a sewer or water course is a thorough survey, including measurement of the internal dimensions at frequent intervals, for example every 5 or 10 meters. After the survey has been carried out an invert section is designed which will be a good fit in the lower part of the sewer or water course at the selected location and which can be manhandled around any awkward corners. If there is significant variation in the dimensions between different parts of the sewer or water course due, for example, to differences in its state of deterioration, then precast ferrocement invert sections of different designs may be used from place to place along the length being relined.

If precast ferrocement invert lining units are used (e.g. for the lower part of an egg section sewer) then the steel mesh reinforcement panels should be tied into the invert lining units by means of reinforcement left standing proud of the units. Such precast ferrocement invert lining units are preferably back-grouted prior to spraying on the mortar mix to complete the relining of the upper section of the sewer.

After spraying on the final layer of mortar mix the surface thereof is preferably floated off. Alternatively a brush finish can be given using conveniently a soft nylon bristle brush.

In manufacture of large structures, such as boat or ship hulls, a temporary backing layer can be positioned adjacent one face of the armature and the laid up mesh before mortar is sprayed on with the aid of the illustrated apparatus from the other side of the armature from the temporary backing layer. In this way the mortar is applied from one side only, thereby obviating or minimising the dangers due to incomplete bonding between the first layers applied. This procedure also minimises the risk of formation of cavities due to inadequately working the first layers into the interstices of the steel mesh that are inherent in the traditional method of manufacturing ferrocement hulls. After the cement has set the temporary backing layer is then removed.

I claim:

1. A method of making a water course lining unit comprising a section of ferrocement useful for the in-situ lining of the lower part of a water course, a preformed section comprising a wire mesh reinforcement embedded in at least one layer of an aqueous cementitious composition such that a portion of the wire mesh reinforcement projects out of the aqueous cementitious composition, the method comprising:
   providing an assembly which comprises at least one layer of wire mesh and an adjacent backing layer;
   spraying over the steel wire mesh at least a first and a second layer in turn of an aqueous cementitious composition comprising sand, cement and water;
   working into the interstices of the steel wire mesh and against the backing layer the aqueous cementitious composition of at least the first layer sprayed on the steel wire mesh,
   allowing each layer of aqueous cementitious composition sprayed over the steel wire mesh to dry at least partially before spraying on any next succeeding layer;
   trowelling over the steel wire mesh aqueous cementitious composition of each layer subsequent to the first layer; and
   allowing the final layer of aqueous cementitious composition that is sprayed over the steel wire mesh to set whereby a final layer of cement is formed over said steel wire mesh while a portion of said wire mesh reinforcement is left projecting from the section.

2. A method as claimed in claim 1, wherein the lining unit comprises a precast ferrocement invert section, useful for the lining of an underground sewer.

3. A method as claimed in claim 1 wherein the cementitious composition, prior to setting, comprises cement powder and, per 10 parts by weight of said cement powder, sand in an amount of 15 to 25 parts by weight and water in an amount of 3 to 4 parts by weight.

4. A method as claimed in claim 3 wherein the cementitious composition further comprises conditioned fly ash.

5. A method as claimed in claim 1 wherein the backing layer comprises a mold, one or more layers of wire mesh being laid up in the mold, each spaced from the mold surface, following which the step of spraying the aqueous cementitious composition is performed.

6. A method of in-situ lining or relining a water course which comprises placing in the lower part of the water course a plurality of water course lining units each unit comprising a preformed section of ferrocement, said preformed section comprising a wire mesh reinforcement embedded in at least one layer of an aqueous cementitious composition such that a portion of the wire mesh reinforcement projects out of the aqueous cementitious composition, the method comprising the steps of:
   applying and tying steel mesh reinforcement panels both to the mesh reinforcement which projects from the preformed sections and to an upper section of the interior of the water course; and,
   thereafter spraying at least one layer of aqueous cementitious composition on the mesh reinforcement and the mesh panels.

7. A method as claimed in claim 6 wherein the sprayed cementitious layer is derived from an aqueous cementitious composition comprising cement powder and, per 10 parts by weight of said cement powder, sand in an amount of 15 to 25 parts by weight and water in an amount of 3 to 4 parts by weight.

8. A method as claimed in claim 6 wherein the cementitious composition further comprises conditioned fly ash.

9. A method as claimed in claim 6 which further comprises the steps of:
   providing an assembly which comprises at least one layer of wire mesh and an adjacent backing layer which is the interior of a water course to be lined;
   spraying over the steel wire mesh at least a first and a second layer in turn of an aqueous cementitious composition comprising sand, cement and water;
   working into the interstices of the steel wire mesh and against the backing layer the aqueous cementitious composition of at least the first layer sprayed over on the steel wire mesh;
   allowing each layer of aqueous cementitious composition sprayed over the steel wire mesh to dry at least partially before spraying on any next succeeding layer;
   trowelling over the steel wire mesh aqueous cementitious composition of each layer subsequent to the first layer; and
   allowing the final layer of aqueous cementitious composition that is sprayed over the steel wire mesh to set whereby a final layer of cement is formed over said steel wire mesh thereby completing the relining.

10. A method as claimed in claim 6 which is an in-situ lining or relining method of an underground sewer or other water course while water is permitted to flow through the section thereof being lined or relined, and wherein above ground supplies of the aqueous cementitious composition and compressed air are supplied to effect spraying onto the mesh which projects from said sections which are located in the interior and which are affixed to the interior of the water course.

11. A method as claimed in claim 6 in which method the spraying of the cementitious composition is carried out using a mortar spray gun comprising a barrel terminating at a nozzle, an air conduit extending through the barrel from an air inlet at the end of the barrel remote from the nozzle and terminating at an air outlet that lies in a zone adjacent to the nozzle and within the barrel, and a hollow handle portion having a slurry conduit extending therethrough that communicates with the interior of the barrel and terminates at a mortar supply inlet.

12. A method as claimed in claim 11 wherein the air conduit is mounted adjustably within the mortar spray gun so that the position of the air outlet can be varied in relation to the position of the nozzle, thereby to vary the spray pattern of the aqueous cementitious composition sprayed by the gun.

13. A method as claimed in claim 11 wherein the gun has a hollow handle in communication with a generally hollow barrel which terminates at its forward end with a nozzle of reduced diameter, and a tube forming an air conduit is located within the barrel having an air inlet at one end of the barrel and an air outlet located within the barrel in a zone adjacent said nozzle.

14. A method as claimed in claim 6 in which method the spraying of the cementitious composition is carried out using an apparatus for spraying mortar including:
   mortar reservoir means;
   air compressor means;
   a mortar spray gun;
   mortar pumping means for pumping mortar from the mortar reservoir means to the mortar spray gun;
   a first mortar conduit means connecting the mortar reservoir means to the mortar pumping means;
   a second mortar conduit means connecting the mortar pumping means to a mortar inlet; and
   air hose means connecting the air compressor means to the air inlet of the mortar spray gun.

15. A method as claimed in claim 14 wherein the mortar pumping means is adapted to deliver mortar to the spray gun at a pressure of at least 25 bar.

16. A method as claimed in claim 14 wherein the mortar pumping means is adapted to deliver mortar at a rate up to 1 ton of mortar per hour.

17. A method as claimed in claim 14 wherein the mortar pumping means includes a two-piston pump and a hose of up to about 200 meters for the above ground mortar supply.

18. A water course lining unit, comprising a preformed section of ferrocement useful for the in-situ lining of the lower part of a water course, the preformed section comprising a wire mesh reinforcement embedded within at least one layer of an aqueous cementitious composition comprising sand, cement and water which has been allowed to set, and wherein a portion of said wire mesh reinforcement is left projecting out of said aqueous cementitious composition whereby an associated steel mesh reinforcement panel is selectively tied into the lining unit at the mesh reinforcement portion which is projecting.

19. A lining unit as claimed in claim 18 which is a precast invert section useful for the in-situ lining of the lower part of a water course.

20. A lining unit as claimed in claim 18 comprising a section which is useful for the lining of an underground sewer.

21. A lining unit as claimed in claim 18 wherein the cementitious composition is characterized in that, prior to setting, it comprises cement powder and, per 10 parts by weight of said cement powder, sand in an amount of 15 to 25 parts by weight and water in an amount of 3 to 4 parts by weight.

22. A lining unit as claimed in claim 21 in which said composition further comprises conditioned fly ash.

23. A water course lining unit, comprising a ferrocement section useful in lining the lower part of a water course, when made by a method as claimed in claim 1.

24. A water course lining unit, comprising a ferrocement section useful in lining the lower part of a water course, when made by a method as claimed in claim 2.

25. A water course lining unit, comprising a ferrocement section useful in lining the lower part of a water course, when made by a method as claimed in claim 3.

26. A water course lining unit, comprising a ferrocement section useful in lining the lower part of a water course, when made by a method as claimed in claim 4.

27. A water course lining unit, comprising a ferrocement section useful in lining the lower part of a water course, when made by a method as claimed in claim 5.

28. A ferrocement lined water course, when made by a method as claimed in claim 6.

29. A ferrocement lined water course, when made by a method as claimed in claim 9.

30. A ferrocement lined water course when made by a method as claimed in claim 10.

31. A ferrocement lined water course when made by a method as claimed in claim 11.

32. A ferrocement lined water course when made by a method as claimed in claim 14.

33. A ferrocement lined water course when made by a method as claimed in claim 15.

34. A ferrocement lined water course when made by a method as claimed in claim 16.

35. A ferrocement lined water course when made by a method as claimed in claim 17.

* * * * *